(12) United States Patent
Nguyen et al.

(10) Patent No.: US 12,388,320 B2
(45) Date of Patent: Aug. 12, 2025

(54) LINEAR CAPTIVE MOTOR-LEADSCREW ASSEMBLY

(71) Applicant: Lin Engineering, Inc., Morgan Hill, CA (US)

(72) Inventors: Harlan H. Nguyen, San Jose, CA (US); Hung H. Pham, San Jose, CA (US); Hoang H. Le, San Jose, CA (US)

(73) Assignee: Lin Engineering, Inc., Morgan Hill, CA (US)

( * ) Notice: Subject to any disclaimer, the term of this patent is extended or adjusted under 35 U.S.C. 154(b) by 297 days.

(21) Appl. No.: 18/221,718

(22) Filed: Jul. 13, 2023

(65) Prior Publication Data

US 2025/0023422 A1 Jan. 16, 2025

(51) Int. Cl.
| | |
|---|---|
| *H02K 7/06* | (2006.01) |
| *H02K 37/24* | (2006.01) |
| *H02K 41/02* | (2006.01) |

(52) U.S. Cl.
CPC .............. *H02K 7/06* (2013.01); *H02K 37/24* (2013.01); *H02K 41/02* (2013.01); *H02K 2213/12* (2013.01)

(58) Field of Classification Search
CPC .......... H02K 7/06; H02K 37/24; H02K 41/02; H02K 2213/12
USPC ............................................ 310/12.01, 49.01
See application file for complete search history.

(56) References Cited

U.S. PATENT DOCUMENTS

| | | | |
|---|---|---|---|
| 6,240,798 B1 | 6/2001 | Erickson et al. | |
| 7,891,265 B2 | 2/2011 | Erickson et al. | |
| 9,964,201 B2 | 5/2018 | Lin et al. | |

FOREIGN PATENT DOCUMENTS

| | | | | |
|---|---|---|---|---|
| CN | 100549412 C | * | 11/2009 | |
| CN | 116094242 A | * | 5/2023 | ............ H02K 7/116 |
| GB | 2613175 A | * | 5/2023 | ............ B60T 13/745 |
| JP | 2019002461 A | * | 1/2019 | ............ F16H 25/24 |

* cited by examiner

*Primary Examiner* — Jose A Gonzalez Quinones
(74) *Attorney, Agent, or Firm* — Mark Protsik; Thomas Schneck

(57) ABSTRACT

A captive leadscrew-type linear actuator assembly has a motor whose rotor has a rearward extending hollow bore shaft. An external nut assembly fixed to the bore shaft to rotate with rotor engages a lead screw. An anti-rotation radial support plate attaches to a front of the motor with a non-circular hole that prevents rotation of a rod or piston attached to the lead screw.

Accordingly, torque applied by the rotor through the nut to the lead screw is converted into linear motion wherein the rod or piston passes through the hole. Replaceable external components lead to greater design flexibility together with improved motion accuracy and durability.

16 Claims, 5 Drawing Sheets

LINEAR CAPTIVE MOTOR-LEADSCREW ASSEMBLY

TECHNICAL FIELD

The invention relates to linear actuator assemblies combining a dynamo-electric motor supplying rotary motion and helical toothed gearings in the form of a lead screw to translate the rotary motion into linear motion, the rotary and linear motion being at least partially conveyed within the motor's axial shaft. In particular, the invention relates to improvements to such assemblies of the linear captive type that allow adaptability to variable accessories of different design specifications, as well as increasing the accuracy and precision of linear movement.

BACKGROUND ART

In lead screw linear actuators, electric motors (usually stepper motors) are paired with lead screws to transform torque into linear force. One configuration for such motor assemblies has a nut housed internally within the motor's hollow axial shaft. Typically, the hollow shaft is composed of soft metal, and a plastic injection material at the shaft's center is machined into a nut corresponding to the lead screw's specification. This internal nut is integral to the rotor and transmits torque to the lead screw. To translate the rotary motion into linear motion, the lead screw must be prevented from rotating. Otherwise, it would simply rotate with the rotor and the internal nut. Once constrained by some anti-rotation feature, however, the lead screw will translate linearly along the motor's rotational axis. The linear motion of the lead screw can be a continuous movement or discrete movements stepping to any of a sequence of fixed linear positions.

In non-captive linear actuators, the motor-lead screw assembly does not itself supply the necessary anti-rotation feature for the lead screw. Rather, this must be externally supplied by whatever mechanical components to which the actuator assembly will attach. A non-captive linear actuator can be used whenever the machine design already includes a fixed guide mechanism with a built-in anti-rotation feature. An end user attaches the actuator assembly to an external linear guide rail assembly to prevent lead screw rotation. As the motor rotates the internal nut, the isolation of the lead screw from the rotation induces direct linear motion of the lead screw through the motor assembly.

To alleviate the end user requirement for attaching fixed external guide rails, which may not always be feasible, motor manufacturers have devised a captive linear actuator design that incorporates the lead screw guiding and anti-rotation features onto the motor assembly's front end. This creates a stand-alone unit that pushes and pulls whatever device to which it is attached. This type of actuator can even provide a linear pushing force without being attached to anything.

A typical captive linear actuator employs a splined linear-motion bearing. (A mechanical spline is a ridge or tooth on a drive shaft that matches with a groove in a mating piece and transfers torque to it, maintaining the angular correspondence between them. A linear-motion bearing is any bearing designed to provide free sliding motion in only one axis.) Here, the lead screw connects to a rod to form a two-part shaft. The lead screw mates with the internal nut within the motor, while the rod mates with a cylindrical tube with hollow cavity that forms a sleeve bushing. The cylindrical tube is affixed to the front of the motor body to provide an anti-rotation function. The cylindrical tube's inner cross-section can range from simple elliptical and polygonal profiles to other more complex noncircular profiles. These splined profiles of the rod and tube prevent the lead screw and rod from rotating. The rod surface profile matches that of the cylindrical tube to allow it slide axially as the lead screw is driven back and forth with corresponding clockwise and counterclockwise turns of the motor. Except for this added anti-rotation mechanism, the mode of operation of both non-captive and captive linear actuators is identical.

The current form of linear actuators is less than optimal for several reasons. For captive linear actuators the rather large anti-rotation mechanism with its elongated cylinder bushing attached to the front of the motor necessitates more expansive system envelopes to be able to physically accommodate the motor assembly. Meeting this prerequisite is not always possible. Furthermore, as the hollow cylinder bushing serves as the anti-rotation feature, the stroke length cannot surpass the cylinder's length. Thus, the design imposes a maximum stroke length constraint equal to the hollow cylinder's length. The hollow cylinder is typically a tooled component, along with the matching rod; hence, modifications and customizations are generally unsupported without incurring considerable expense in both time and money. Inability to modify the hollow cylinder often precludes a manufacturer from enhancing linear movement accuracy in individual assemblies by attempting to diminish the cross-sectional engagement between any given rod and hollow cylinder (thereby improving the radial support factor of the rod).

More generally, the inventors have realized that the use of an internal nut to drive the lead screw leads to both performance and design flexibility deficiencies in these actuators. The internal nut and lead screw attachment is shrouded by the motor and so is unable to dissipate heat generated by friction between the nut and the lead screw. This internally generated heat not only adversely affects the motor, but also degrades the life of the nut and lead screw assembly. Also, the motor internal shaft's nut geometry is predetermined at the time it is machined for a particular lead screw specification. Thus, the motor is not a universal component, and the nut is not a variable accessory, but both are restricted to use with one specific lead screw. Only lead screws with that matching specification can be used in that motor. This means that if a choice of lead screw is to be given, then a range of motor assemblies with different internal nut parameters need to be offered. Still further, the use of internal nuts restricts the ability to offer linear actuator designs with anti-backlash or ball screw features.

SUMMARY DISCLOSURE

A linear captive motor-leadscrew assembly is provided using an external nut affixed (and optionally: removably affixed) to a rearward-extending rotary bore shaft. As opposed to industry practice, the invention does not house the nut in the center of the hollow shaft. An electric motor comprises a rotor mounted for axial rotation within a stator, the rotor having a hollow, axial, circular-cylindrical bore shaft extending rearward from the motor. An anti-rotation radial support plate is mounted on the front end of the electric motor with an axial non-circular hole through the plate. A leadscrew-and-piston assembly has a lead screw attached at its head to a base of a piston or rod. The lead screw and piston both slidably fit within the bore shaft. The piston or rod has a non-circular-cylindrical (e.g., polygonal) cross-section that fits slidably through and conformably into the non-circular hole in the support plate to prevent axial rotation of the leadscrew-and-piston assembly. A nut is attached exterior to the motor upon an outer end surface of the rearward extending bore shaft to rotate together with the rotor. The nut has an interior screw surface that engages conformably with the lead screw to transfer torque into linear motion of the leadscrew-and-piston assembly.

DETAILED DESCRIPTION

Figure 1:
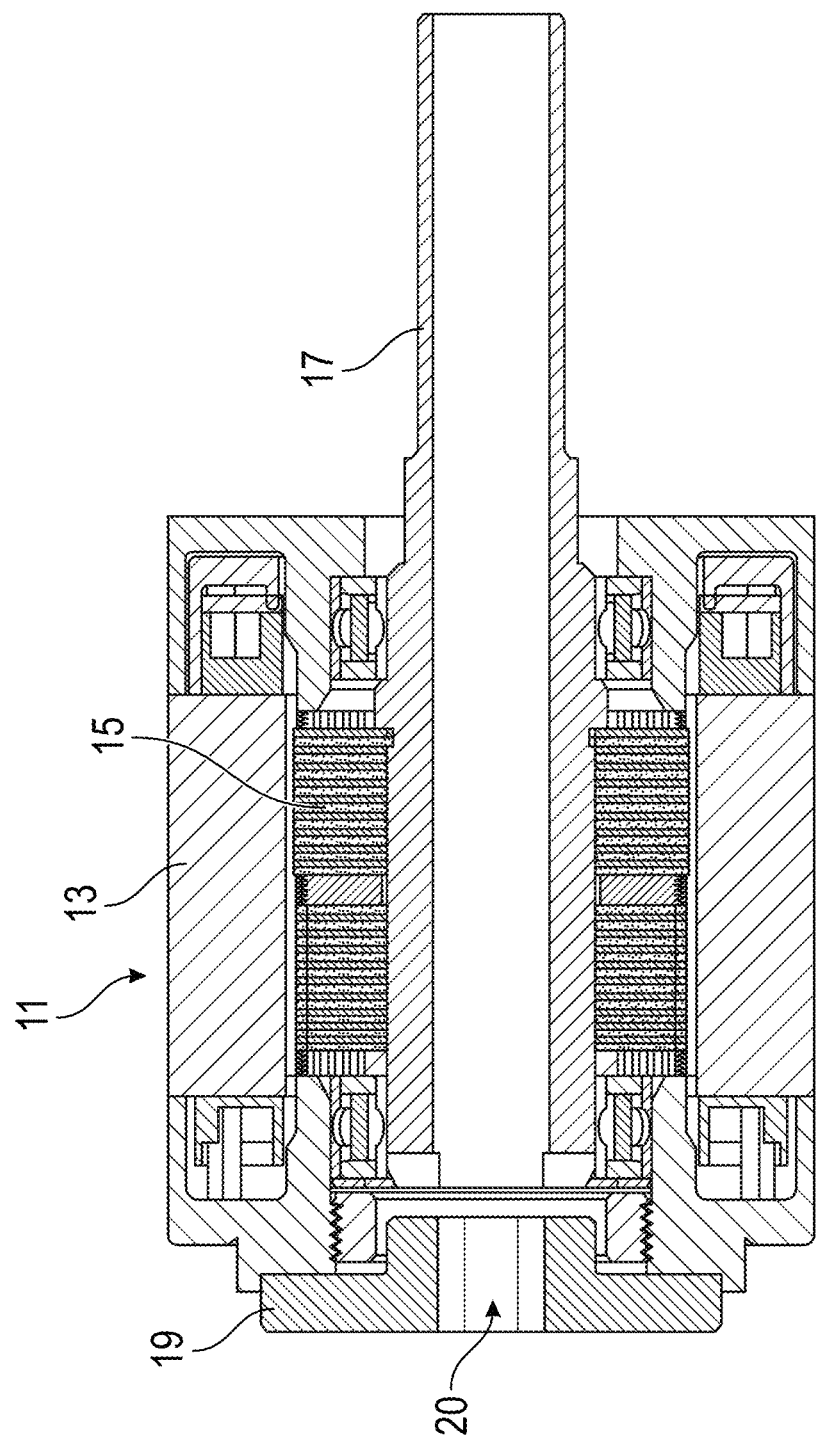
FIG. 1 is a side sectional view of a motor (through the motor's rotational axis) for use in a linear actuator in accordance with the present invention, with an anti-rotation radial support plate on one end of the motor.

With reference to FIG. 1, an electric motor 11 for use in a linear actuator is seen having a stator 13 and a rotor 15 mounted for axial rotation within the stator 13. Typically, motor 11 is a stepper motor, but other types of motors could be used. Rotor 15 includes a hollow, axial bore shaft 17 with a uniform circular-cylindrical internal cross-section and that extends rearward (to the right in this view) from motor 11. The bore shaft 17 (and anything affixed to it) rotates with rotor 15. In some embodiments, the rearward extending bore shaft 17 (or the entire rotor) can be a modular component of the motor that is replaceable, if desired, with another bore shaft having a different length. Alternatively, a selection of motors 11 with different length bore shafts 17 can be provided.

An anti-rotation radial support plate 19 is removably attached to a front end (on the left in this view) of motor 11. Support plate 19 can be very thin, typically only 1 mm thick, to add as little extra form factor as possible to the motor. An axially located, non-circular hole 20 passes through the support plate. Internal cross-sections of the anti-rotation hole 20 can range from elliptical and polygonal (e.g., hexagonal, or dodecagonal) profiles to more complex profiles, as seen for example in FIG. 5 (seen there as a hexagonal through hole).

Figure 2:
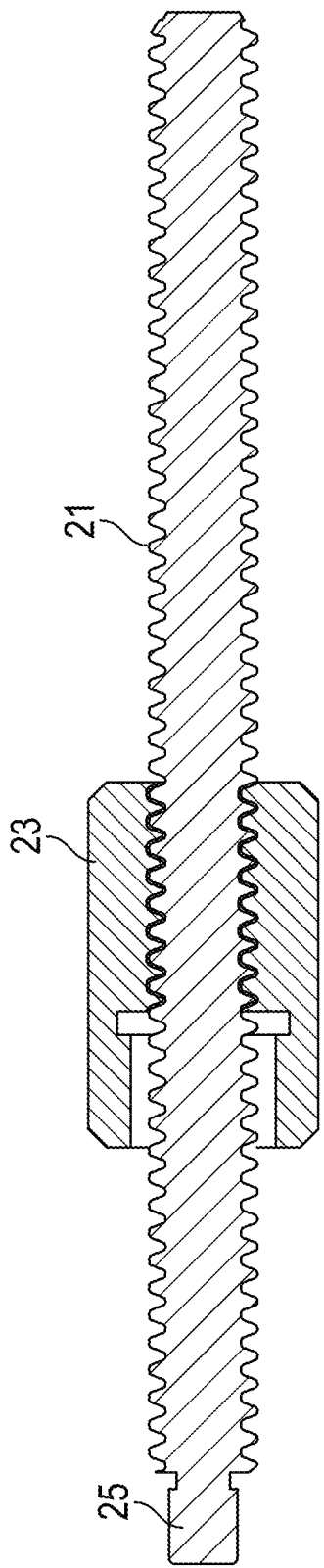
FIG. 2 is a side sectional view of a leadscrew-nut assembly for use with the motor of FIG. 1.
Figure 3:
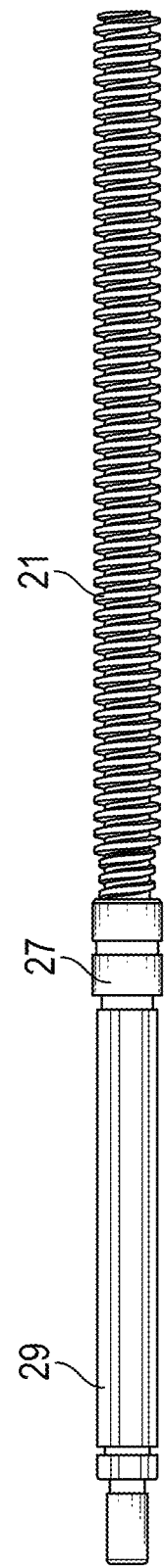
FIG. 3 is a side plan view of a leadscrew-and-piston assembly combining a lead screw with an attached piston or rod, for use with the motor of FIG. 1.
Figure 7:
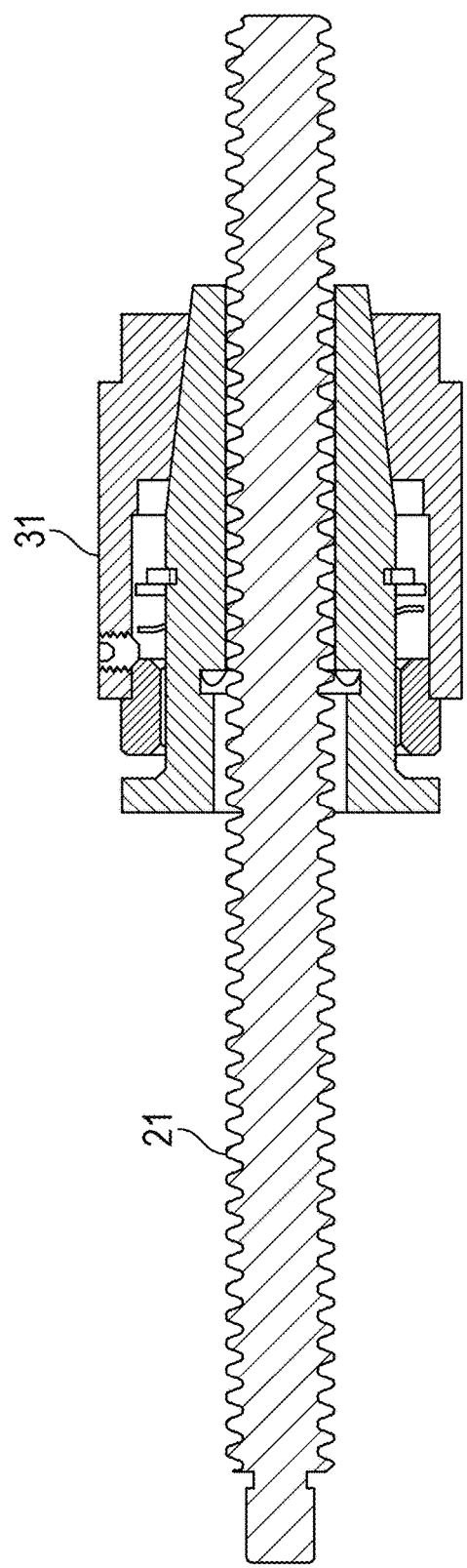
FIG. 7 is a side sectional view of a leadscrew-nut assembly employing an alternative anti-backlash nut.
Figure 8:
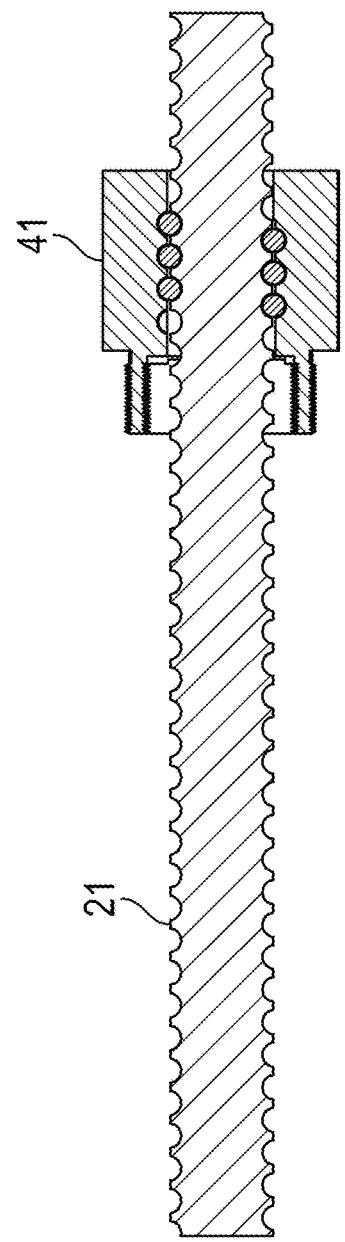
FIG. 8 is a side sectional view of a leadscrew-nut assembly employing an alternative ball screw nut.

With reference to FIG. 2, another element of a linear actuator is a lead screw 21, here engaging with a nut assembly 23 (shown as a simple nut). Other forms of nut assembly 23 may include an anti-backlash nut 31 (as in FIG. 7) or a ball screw nut 41 (as in FIG. 8). The lead screw 21 can have any of a variety of possible specifications (diameters, left-handed or right-handed screw directions, thread pitches, thread angles, thread profiles, tooth profiles, etc.). Nut assembly 23 will likewise have corresponding internal screw (and/or ball) specifications to engage the lead screw 21 within specified tolerances. A head 25 of the lead screw 21 is provided to allow for attachment to the base 27 of a piston or rod 29 of the linear actuator, as seen in FIG. 3. Alternatively, the leadscrew-and-piston assembly could be fabricated as a unitary piece. However, having both lead screw 21 and the rod or piston 25 as a modular pair, which could be individually replaced as needed in the event of wear or breakage, or in the event of a redesign requiring new lead screw specifications, is advantageous.

Figure 4:
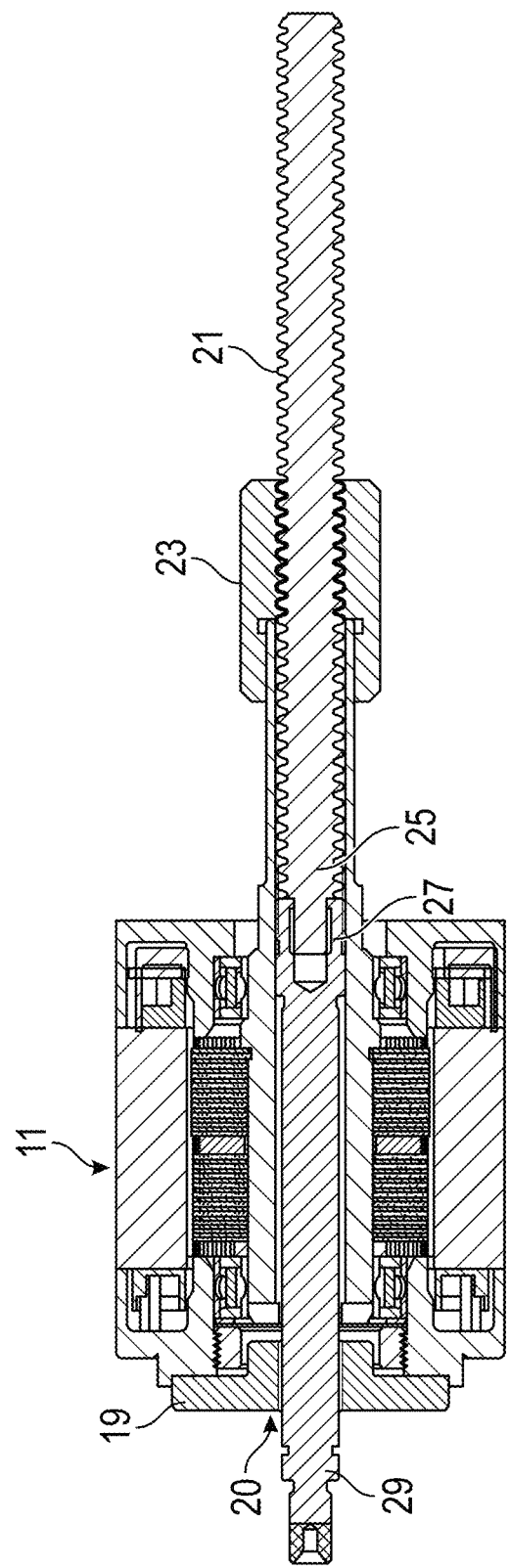
FIG. 4 is a side sectional view of a complete linear captive motor-leadscrew assembly in accord with the present invention.

With reference to FIG. 4, a complete captive linear actuator assembly is shown. Motor 11 has a rearward extending hollow bore shaft 17 that is a part of and rotates with the rotor. Nut assembly 23 is fixed to an end of that bore shaft 17, e.g., attached upon that shaft's outer surface, so that the nut also rotates with the rotor. Nut assembly 23 may be removable from its attachment to the bore shaft 17 to be replaceable if either necessary or desired. The nut 23 has an interior screw surface that engages with the lead screw 21 with a matching exterior screw surface. Alternatively, the nut assembly can be anti-backlash nut 31 (as in FIG. 7) or a ball screw nut 41 (as in FIG. 8), where in each case the lead screw thread surface and nut interior thread (and/or balls) have conforming specifications. The lead screw 21 and nut assembly 23 can be a modular pair of replaceable components. The lead screw 21 is attached at its head 25 to a base 27 of a piston 29 so that the two form a leadscrew-and-piston assembly. (It could also be fabricated as a unitary piece.). Both the lead screw 21 and the piston 29 can slide freely within the hollow bore shaft 17. The lead screw 21 only engages with the nut assembly 23, while the piston 29 only engages with the hole 20 in the radial support plate 19.

Figure 6B:
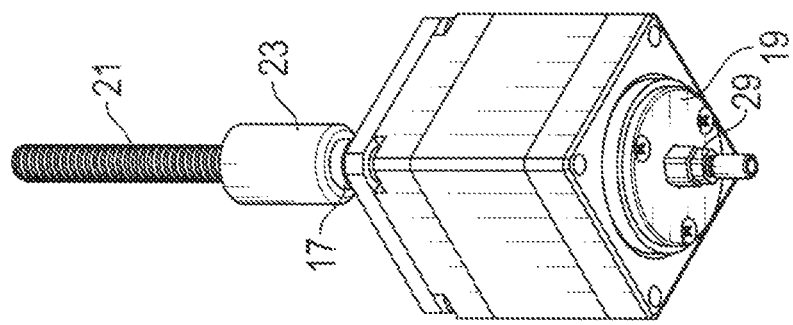
FIGS. 6A and 6B are perspective views of complete linear actuators as in FIG. 4 in respective extended and retracted positions of the piston.
Figure 6A:
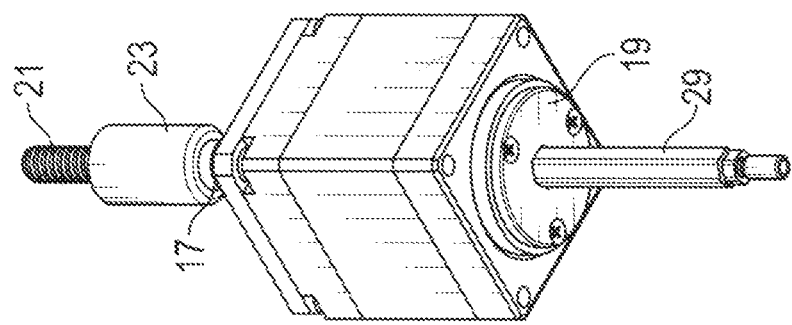
Figure 5:
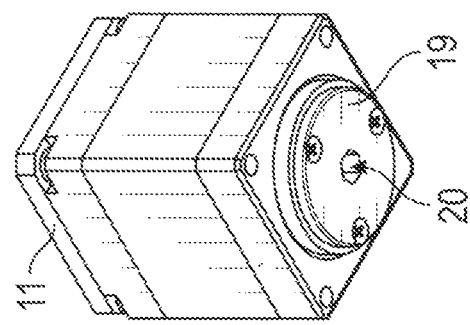
FIG. 5 is a perspective view of the motor of FIG. 1 with its anti-rotation radial support plate on one end, but without the piston, nut, or lead screw of a complete linear actuator.

The motor's front end (on the left side in this view) has an anti-rotation radial support plate 19 with a an axially positioned, non-circular hole 20 that receives the piston 29. As seen in FIG. 5, that hole 20 can have a polygonal (e.g., hexagonal, or dodecagonal) profile. As seen in FIGS. 6A and 6B, the outer surface of the piston 29 has a matching profile with hole 20, so that the piston 29 can freely slide linearly through the hole 20 along the motor's rotational axis between extended and retracted positions, but cannot rotate. The radial support plate 19 is a modular component that can be removed from the end of motor 11 and replaced. For example, if it is determined that any given individual piston 29 has a cross-section that is slightly too small, so that there is undesired amount of radial play, then a different radial support plate 19 with corresponding smaller hole 20 could be easily substituted.

When the motor is commanded to rotate, torque will be generated to the main shaft, which is then transferred to the attached nut at the rear of the main shaft. The nut, then transfers torque to the leadscrew. This will cause the leadscrew to rotate, however, since the leadscrew is attached to the piston, and the piston is prevented from rotating via the anti-rotation plate attached in the front of the motor, the leadscrew will be either pushed or pulled through the axis of rotation of the nut based on the direction of rotation of the shaft.

Numerous advantages may be observed here. The motor is fully assembled and operational without any specific modifications to the mechanism of attachment. This convenience provides an economic advantage to the manufacturer as the motor is treated as a universal assembly. Universal assemblies can be used to support endless variations of modifications. Likewise, the nut is treated as a variable accessory, meaning that it can take on the form of a free running nut, an anti-backlash nut, or a ball screw assembly. The variety of linear attachments offer the end users the ability to optimize performance based on their specific application requirements. Typically, the industry does not offer a captive linear actuator motor assembly with anti-backlash or ball screws. The invention opens the possibility of a such combinations to exist.

Because the mechanism of attachment (nut and leadscrew) is not shrouded by the motor assembly, the motor no longer incurs thermally induced losses, nor is there accelerated wear leading to degradation of life of the nut and leadscrew assembly. The benefit of having an externally located nut and leadscrew assembly is the ability to dissipate thermal losses generated by the friction between the nut and the leadscrew.

Since the mechanism of attachment is integrated post-motor-assembly, a variety of leadscrew specifications may be used. Currently, the industry practice is to machine nut geometries inside the hollow shaft prior to full motor assembly, with the consequent limitation that each machined shaft is dedicated to one specific leadscrew design. This is no longer the case, as lead screws can be easily swapped out for those with another specification, together with the corresponding external nut.

The radial support plate attached to the front of the motor serves a dual purpose. The first is the anti-rotation mechanism and the second is the radial support mechanism. By providing radial support, the plate will more accurately guide the piston which will result in higher accuracy and precision during and repeated linear movements. Industry captive motors with hollow cylinder tubes have large mating surfaces which allows the piston to sway under load. The unaccounted radial play of these motors contributes to higher inaccuracy as the piston travels at an angle of the intended path, instead of directly up and down the axis of rotation. Also, as compared to the current offerings of the industry, the invention does not have a large attachment in the front of the motor. Eliminating the large hollow cylinder in the front of the motor means that a large cavity is not required in the recipient system. Designers have the degree of freedom as they normally would compare to a non-captive linear motor. This invention allows the designer to mount the front side of the motor assembly as close as 1 mm away from their system.

The maximum stroke length may be augmented without necessitating exorbitant tooling expenses or extensive delays. The hollow shaft can be effortlessly machined to an extended length to accommodate a lengthier piston and leadscrew, thereby increasing the maximum stroke length. Such adaptability is currently absent in the prevailing industry practices.

The invention claimed is:

1. A linear captive motor-leadscrew assembly, comprising:
    an electric motor with a rotor mounted for axial rotation within a stator, the rotor having a hollow, axial, circular-cylindrical bore shaft extending rearward from the motor;
    an anti-rotation radial support plate mounted on a front end of the electric motor with an axial non-circular hole through the plate;
    a leadscrew-and-piston assembly having a leadscrew attached at its head to a base of a piston, the leadscrew and piston both slidably fitting within the bore shaft, and the piston having a non-circular-cylindrical cross-section that fits slidably through and conformably into the non-circular hole in the support plate to prevent axial rotation of the leadscrew-and-piston assembly; and
    a nut attached exterior to the motor upon an outer end surface of the rearward extending bore shaft to rotate together with the rotor, the nut having an interior screw surface that engages conformably with the leadscrew to transfer torque into linear motion of the leadscrew-and-piston assembly.

2. The linear captive motor-leadscrew assembly as in claim 1, wherein the electric motor is a stepper motor.

3. The linear captive motor-leadscrew assembly as in claim 1, wherein the piston has a polygonal prismatic cross-section that fits slidably through and conformably into a polygonal hole in the support plate.

4. The linear captive motor-leadscrew assembly as in claim 3, wherein the polygonal cross-section of both the piston and the hole in the support plate have between six and twelve sides.

5. The linear captive motor-leadscrew assembly as in claim 1, wherein the radial support plate is at most 1 mm thick.

6. The linear captive motor-leadscrew assembly as in claim 1, wherein the nut is an anti-backlash nut.

7. The linear captive motor-leadscrew assembly as in claim 1, wherein the nut is a ball screw nut.

8. The linear captive motor-leadscrew assembly as in claim 1, wherein the leadscrew and nut are a modular pair of replaceable components removable from the respective piston and bore shaft.

9. The linear captive motor-leadscrew assembly as in claim 1, wherein the leadscrew-and-piston assembly is fabricated as a unitary piece.

10. The linear captive motor-leadscrew assembly as in claim 1, wherein the bore shaft extending rearward from the motor is a modular component of the motor that is replaceable with another bore shaft of a different length.

11. A linear captive motor-leadscrew assembly, comprising:
    an electric stepper motor with a rotor mounted for axial rotation within a stator, the rotor having a hollow, axial, circular-cylindrical bore shaft extending rearward from the motor;
    an anti-rotation radial support plate mounted on a front end of the electric motor with an axial non-circular hole through the plate;
    a leadscrew-and-piston assembly having a leadscrew attached at its head to a base of a piston, the leadscrew and piston both slidably fitting within the bore shaft, and the piston having a polygonal prismatic cross-section that fits slidably through and conformably into polygonal hole in the support plate to prevent axial rotation of the leadscrew-and-piston assembly; and
    a nut attached exterior to the motor upon an outer end surface of the rearward extending bore shaft to rotate together with the rotor, the nut having an interior screw surface that engages conformably with the leadscrew to transfer torque into linear motion of the leadscrew-and-piston assembly.

12. The linear captive motor-leadscrew assembly as in claim 11, wherein the leadscrew and nut are a modular pair of replaceable components removable from the respective piston and bore shaft.

13. The linear captive motor-leadscrew assembly as in claim 12, wherein the leadscrew-and-piston assembly is fabricated as a unitary piece.

14. The linear captive motor-leadscrew assembly as in claim 12, wherein the nut is an anti-backlash nut.

15. The linear captive motor-leadscrew assembly as in claim 12, wherein the nut is a ball screw nut.

16. The linear captive motor-leadscrew assembly as in claim 11, wherein the bore shaft extending rearward from the motor is a modular component of the motor that is replaceable with another bore shaft of a different length.

* * * * *